United States Patent
Tarbet

(12)
(10) Patent No.: US 6,716,458 B1
(45) Date of Patent: Apr. 6, 2004

(54) NUTRITIONAL SUPPLEMENT

(76) Inventor: Bryon J. Tarbet, 11066 N. 5730 W., Highland, UT (US) 84003

( * ) Notice: Subject to any disclaimer, the term of this patent is extended or adjusted under 35 U.S.C. 154(b) by 19 days.

(21) Appl. No.: 09/650,268

(22) Filed: Aug. 7, 2000

Related U.S. Application Data

(60) Provisional application No. 60/147,655, filed on Aug. 6, 1999.

(51) Int. Cl.[7] ................................................ A61K 47/02
(52) U.S. Cl. ........................ 424/639; 424/439; 424/442; 424/484; 424/488; 424/601; 424/602; 424/610; 424/617; 424/620; 424/630; 424/641; 424/646; 424/657; 424/667; 424/673; 424/703; 424/718; 424/723; 426/648; 426/658
(58) Field of Search ................................ 424/484–502, 424/439, 442, 488, 440, 441, 601, 602, 610, 617, 620, 630, 639, 641, 646, 657, 667, 673, 703, 718, 723; 426/648, 658

(56) References Cited

U.S. PATENT DOCUMENTS 4,338,350 A * 7/1982 Chen et al. .................. 426/658

* cited by examiner

*Primary Examiner*—Neil S. Levy
(74) *Attorney, Agent, or Firm*—Tarbet IP; Ken Tarbet

(57) ABSTRACT

The is invention is directed to a composition useful for assisting in supplying a warm-blooded animal with many of its nutritional needs. More specifically, this invention is directed to a composition whereby many of the vitamins, minerals, amino acids and cofactors are suspended in a matrix which when administered to a mammal provides substantial benefit.

3 Claims, No Drawings

NUTRITIONAL SUPPLEMENT

This application claims priority of the Provisional Application serial No. 60/147,655 filed Aug. 6, 1999.

This invention is directed to a composition useful for assisting in supplying a warm-blooded animal with its nutritional needs. Specifically, this invention is directed to a composition which supplies a warm blooded animal with many of its nutritional needs through the water it drinks and the food it eats. Notably, one expects, a priori, for an animal to obtain these required nutrients through either drinking or eating. However, normal food intake is often insufficient to provide sufficient amounts of many of these elements, minerals and vitamins. Most specifically in the case of farm animals, such as horses, the animal may be deficient in desirable minerals. The supply and intake of many of these minerals is increased through the addition of the composition of this invention to the animal's drinking water and/or food. Moreover the composition and method according to the present invention is directed to providing at least an increase in the intake of minerals, elements and vitamins of warm blooded animals, including humans, farm animals and pets, for example. Additionally, this invention is directed to a composition which when added to an animals drinking water subjectively increases the animal's desire to drink.

1. BACKGROUND

War blooded animals, including humans fail to intake all the vitamins and minerals needed, or at least desired for optimal functioning. Deficiencies in minerals and vitamins may occur because of several potential reasons. For many humans, it may be due to the varying needs of each individual, which are not adequately met by a standard diet. Furthermore, insufficiencies may be due to the increased usage of these minerals, which is greater than the amount supplied through diet. Moreover, many forms of minerals and vitamins become biologically unavailable secondary to digestion in the stomach, intestines, liver or other process, which renders the mineral unavailable. It would therefore be useful to provide a nutritional supplement which supplies many of these biological wanted, and often essential minerals and elements in a bio-available form.

2. OBJECTS OF THE INVENTION

It is therefore an object of this invention to provide a nutritional supplement that gives a warm-blooded animal many of the micronutrients required facilitating efficient processing of ingested food.

It is an additional object of this invention to provide an aqueous composition, which provides many of the required vitamins and minerals to a warm-blooded animal.

It is an additional object of this invention to provide a scented or colored drinking composition for increasing the desire for a warm-blooded animal to drink.

These objects are accomplished through a composition which contains the elements Sb, As, B, Br, Yb, Pd, Re, F, Ir, La, W, Cs, C, Pt, Tm, N, Ni, Ta, Tb, Fe, KI, Co, Mn, Mo, V, Ag, Mg, Cr, Cu, Zn, Ca, Si, Sn, Ni, P, S and N in amounts of about 10 vgram to about 1 gram as an organic or inorganic salt, chelated or complexed state.

However, it is well known that you can lead a horse to water, but you can't make him drink, even if the drink has been made nutritous because of the addition of the nutrative composition of this invention to the drinking water of the warm blooded animal.

DEFINITIONS

The term "matrix" as used herein and in the appended claims shall mean a complex, chelate, covelently defined pocket or other organic or organometallic-defined system capable of retaining or holding a metal ion. The term matrix further shall mean any association between the organic molecules and the metals capable of suspending or otherwise holding the metal within the matrix. The matrix shall further be understood to mean the association of a single organic molecule with a metal and with electrostatic and/or hydrogen bonding interactions between these individual matrix monomer units.

The term "matrix monomer" shall mean a single unit of the matrix which may be visualized as the interaction between one or more organic molecules and at least one ion. The interaction between the ion and the organic molecule or molecules may be an electrostatic attraction, an ionic interaction, a partial covalent bond, a full covalent bond or any combination thereof.

The term "desirable flavor" or "desirable taste" means that the object about to be ingested has a taste desirable or at least favorable to the ingesting animal.

The term "desirable color" is to mean the presentation of the optical characteristics of an object to the viewing animal in a pleasing optical manner. However, because it is not apparent how or what any animal may perceive as a desirable color or visual presentation, the scope of the present invention is not limited to the presentation of an object in a desirable color, but may also facilitate the presentation of the object in a desirable hue, or reflective quality, etc. The object may take a different color or perhaps it becomes darker, but to the animal, the object is a different than other objects. For example, where a color additive and a flavor additives are introduced into a watering tank to enforce, the water they or may not looked colored but the porch can tell that the water is then other water it has known and because it trusts the former it will be led to drink, and they're after, the enhanced flavor and color may elicit a Pavlovian response; increasing the propensity for the horse to drink. It is not necessary for the animal to actually gypsy or perceive the visual changes produced by the addition of the optional additives of this invention. Indeed, many experts assert that the dogs and horses are colorblind and could not therefore see a change in color to their drinking water. However, regardless of the truth or falsity of that scientific statements, the addition of the present additives according to this invention, to a mammals drinking water increases the mammals desire to drink of that treated water.

By the other desirable components is meant substances, which have been found to be a wanted part of the diet but for which is science has not found a reason for the observed function, such as chromium picanolate, the extracts from ginko biloba and the Aloe vera plant as well as other homeopathic medications. These additives, minerals, metals and vitamins can also be included in a nutritional supplements formulation for obtaining the benefits in humans.

The above minerals, elements and/or compounds where mixed with glucosamine, brown sugar, sucrose, cellulose, dextrin, amino acids, chondroitin and water. Suitable mixing and drying of the resultant composition provided a nutritional supplement suspended within a matrix in solid form. Although elements and components where mixed according to the above example, it should be understood that no one component is required, and that all components could be added in amounts that vary substantially from the example formulation and still be within the scope of the invention. Additionally, the composition may include cofactors such as acetyl Co-A or a prodrug thereof

EXAMPLES

| Element or composition | Weight |
|---|---|
| Fe | 5 mg |
| KI | 25 υg |
| Co | 1 mg |
| Mn | 12 mg |
| Mo | 100 υg |
| V | 50 υg |
| B | 1 mg |
| Ag | 1 mg |
| Mg | 10 mg |
| Cr | 200 υg |
| Cu | 10 mg |
| Zn | 25 mg |
| Ca | 10 mg |
| Si | 1 mg |
| Sn | 1 mg |
| Ni | 1 mg |
| P | 25 mg |
| S as methionine | 5 mg |
| N | 1 mg |

The above minerals, elements and/or compounds where mixed with glucosamine, brown sugar, sucrose, cellulose, dextrin, amino acids, chondroitin and water providing the nutritional supplement in solid form wherein the above components where suspended within the matrix.

Additional examples of use of the composition according to the present invention include.

A chocolate and lab was given the supplement with his food for a period of six weeks. Before the treatment, he would chase a ball only a few times before really starting to hurt. He would lay down and whine because of joint pain. Glucoseamine supplemental alone was ineffective, but after one week of taking the present supplements, he was obviously improving and after two weeks, his temperament had improved markedly and he could chase the ball for 15 to 20 minutes without noticeable pain.

One individual has for years enjoyed a vigorous exercise regimen of running for miles every other day and jumping rope on the off base. As he has grown older, he has had significant joint pain for 68 hours after the workouts. After taking a supplement, he has no joint pain and feels fully recovered after two hours. He stopped taking all other supplements during the trial.

All the people have noticed an increase in energy and general well-being. There has not a bad one case where someone has seen a detrimental effect.

One woman even noticed re-growth of hair after taking the supplement for 5 weeks. Two diabetics have been taking the supplement. One has noticed a remarkable improvement in energy and sense of well-being, while the other has recovered feeling in her hands and feet which was lost as a result of diabetic neuropathy. The feeling is restored only while taking the supplement.

Four individuals have noticed a dramatic decrease in allergies, which lasts only as long as they're taking the supplement.

One of the above mentioned two diabetics has noticed a much easier time regulating her blood sugar. For two years she has had to get up once or twice a night to eat. She has not had the trouble since two days after she began taking the supplement.

What is claimed is:

1. A nutritional supplement comprising:
    an element complexed or chelated by a matrix formed from a matrix forming composition where the matrix forming composition is at least brown sugar and where the element is not a covalently bound member of the matrix, and where the element is Mn.

2. The nutritional supplement according to claim 1 wherein the element further comprises a member selected from the group: Sb, As, B, Br, Yb, Pd, Re, F, Ir, La, W, Cs, C, Pt, Tm, N, Ni, Ta, Tb, Fe, K, I, Co, Mo, V, Ag, Mg, Cr, Cu, Zn, Ca, Si, Sn, Ni, P, S, and N.

3. The nutritional supplement according to claim 1 wherein the matrix is further formed with at least one of cellulose, dextrin, glucosamine, chondroitin, amino acids, gelatin, polysaccharides and sucroses.

* * * * *